Jan. 5, 1932.  B. S. HUGHES  1,840,234
APPARATUS FOR EVAPORATING INDUSTRIAL LIQUIDS
Filed April 27, 1929
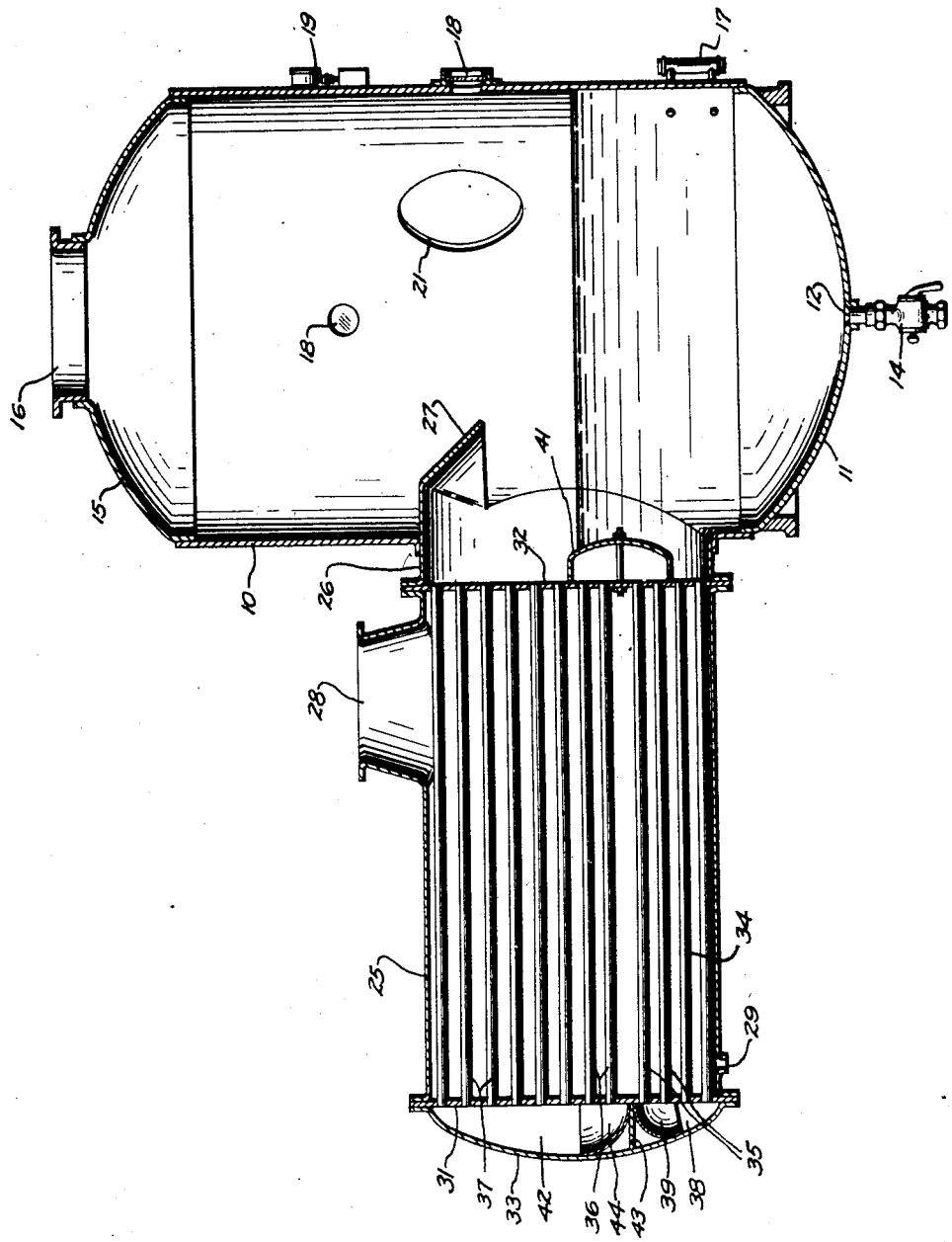
Inventor
Burton S. Hughes
by Burton A. Beau Jr.
Attorney Patented Jan. 5, 1932

1,840,234

UNITED STATES PATENT OFFICE

BURTON S. HUGHES, OF BUFFALO, NEW YORK, ASSIGNOR TO ZAREMBA COMPANY, OF BUFFALO, NEW YORK

APPARATUS FOR EVAPORATING INDUSTRIAL LIQUIDS

Application filed April 27, 1929. Serial No. 358,584.

This invention relates to an apparatus for evaporating and concentrating industrial liquids, and it has particular reference to an apparatus wherein a body of liquid is partially evaporated within a confined space, delivered into a zone to effect the expansion of such vapors as have been formed and a reduction of velocity resistance and pressure, again subjected to evaporation and expansion in a progressive manner, to form a body of vapors whose velocity is controlled within certain desirable limits.

There are many situations in the industries which call for the evaporation and concentration of large quantities of liquids. The usual practice in effecting such treatment is to feed the liquid into a cylindrical shell containing a large number of tubes, through which the liquid may flow, and around which is supplied some heating fluid, such as steam under suitable pressure. The heat from the steam is given up to the tubes, and thence to the liquid, which is caused to boil, and so to liberate vapors which may be removed. A tube heater, is, of course, generally more desirable than an ordinary heating pan or pot, since the tubes provide an increased heating surface which accelerates evaporation and increases the thermal efficiency.

Various proposals have been advanced for augmenting the efficiency of tube evaporators. One suggestion has been to employ a plurality of vertically disposed tubes of great length as compared to their cross-sectional area, so that liquid could rise in the tubes to form quickly evaporating films on the tube walls. The steam so formed aids in lifting the films and imparting high velocity to them, and a high rate of evaporation may be obtained by utilizing this principle. In another way of working, it has been proposed to connect adjacent ends of certain tubes with return bends to form a long conduit, in which the liquid and steam move first in one direction, and then in the other.

It has been observed, however, that the high velocity so obtained does not necessarily produce all the results desired. In fact, in apparatus of the type described, the vapor velocity may, and often does, become so great as to defeat the purpose of obtaining a high rate of heat transfer. What is desired is the wetting with liquid of all of the tubes, but if the internal resistance is high, then the heat can be forced into the remote portions of the tubes only with a high steam pressure, which tends to drive the vapors out at a high velocity preferentially to the liquid, which decreases wetting of the tube and induces undue heating of the vapor. Heat applied to vapor is not efficiently utilized as it is desired to consume the heat in evaporating further quantities of liquid. Hence, when the vapor velocity becomes so great as to race ahead of the liquid film, unsatisfactory operating conditions are encountered. As stated, this racing effect is due to the vapor pressure within the tubes, and the pressure is unnecessarily limited if the tubes offer great resistance. Stated in other language, a too great discharge velocity for the vapors represents a low thermal efficiency in evaporation.

A further word of explanation of this undesirable result may here be in order. It is a well known fact that heat, which is a form of molecular energy, flows from a hot body to a colder body, and will continue so to flow until the bodies reach a common temperature, or state of heat equilibrium. In a general way, it is also true that the rate of heat transfer from the hot body to the cold body increases with the temperature difference, or, conversely, the rate of heat transfer between two bodies at nearly the same temperature is low. Again, the temperature of steam is a definite function of its pressure, so that, in dealing with steam employed for heating a liquid which itself may be partially converted into steam, the difference in pressure serves as a positive measure of the rate of heat transfer, or, in other words, the efficiency of operation. Hence, it will be seen that if a large amount of steam is generated in evaporator tubes having a high resistance, its pressure builds up and approaches that of the heating steam, and further evaporation is curtailed.

In dealing with evaporators in which the tubes are connected by return bends, the effect just mentioned is additionally increased, since the bends offer a high resistance to the flow of liberated vapors and liquid, thus increasing the pressure within the tubes.

The stated prior art constructions have other disadvantages. Extremely high velocities are encountered at the ends of the tubes from which liberated vapors escape, and this results in the atomizing or dispersion of residual liquid into the steam. These small liquid particles are entrained in the exit vapors as a mist, and so may be carried out of the apparatus with resulting loss of their valuable solid constituents. Many industrial liquids are corrosive or errosive in nature, and these, at high velocities, attack the tubes with the result that the apparatus is rapidly worn out or destroyed.

From these considerations, it will be understood that many factors limit the utilization of the film evaporation principle, despite its desirability from the viewpoint of thermal efficiency. According to the present invention, means are provided whereby the film evaporation principle may be employed, but in such manner as to overcome the stated defects. This objective is attained by so constructing the evaporator as to impose a control on the velocity of the liberated vapors, and the pressures within the tubes, in order to maintain a high temperature differential insuring a high thermal efficiency and rapid evaporation.

More specifically, the embodiment of the principles of the invention as herein described comprises a reservoir for liquid which communicates with horizontally disposed tubes adapted to be heated by steam. The liquid flows into a limited number of tubes, or into tubes having collectively a limited cross-sectional area, where it is heated, and a portion is converted into steam. The mixture of steam and liquid then flows into a chamber wherein a certain amount of expansion may occur, with a resulting decrease in velocity and pressure. The expanded mixture is then directed into other tubes, having a greater internal volume, and further quantities of steam are formed. This mixture is again expanded to reduce the pressure, and the operation is continued through such number of passages as conditions make desirable. The finally expanded vapor is then directed against a baffle plate, to effect a separation of any entrained liquid, and then is permitted to flow into a vapor chamber of relatively large volume, to reduce still further the velocity and to prevent liquid matter from forming a mist.

These successive evaporations and expansions do not interfere with the rate of evaporation, and so do not lessen the thermal efficiency, but the stated disadvantages are overcome. A further understanding of the invention may be obtained by reference to the accompanying drawing, which shows a vertical cross-section of one form of apparatus.

The evaporator comprises a vertically disposed cylindrical chamber 10 which is adapted to serve as a reservoir for liquid to be treated and as a vapor chamber for the reception of finally concentrated liquid. The chamber is provided with a bottom wall 11 formed with an opening 12 for the reception of a valve 14, for controlling the withdrawal of concentrated liquid. The top wall 15 of the chamber is formed with a large opening 16 which serves as an exhaust port for liberated vapors, which may be conducted to a condenser or second evaporator, according to well known practice. The chamber 10 is also provided with a liquid tester 17, peep holes 18, gauges 19, and a man hole 21, all of which parts serve well known purposes that need no explanation here. A liquid inlet port (not shown) is also provided at any suitable point, to permit of the introduction of liquid into the apparatus, and to maintain the liquid at a suitable level, such as is indicated in the figure.

A heating shell 25 is positioned in a horizontal manner adjacent the chamber 10, and is interconnected with the chamber by means of a cylindrical member 26 extending from the end of the shell 25 to and through a large opening formed in the side wall of the cylinder 10. The upper portion of the member 26 is positioned above the normal liquid level in the chamber, and it is formed with an inwardly and downwardly projecting lip 27, which serves as a baffle to deflect vapors emerging from the shell 25 down over the surface of the liquid in the chamber 10 and then into the upper or vapor portion of the chamber.

The shell 25 is provided with an inlet port 28 for admitting live steam, and an exit port 29 for removing non-condensible gases and water of condensation. Tube sheets 31 and 32 are positioned in either end of the shell 25, and between them extend a plurality of tubes, in which evaporation may take place. The outer end of the shell 25 is covered by a continuous plate 33, which is hingedly or otherwise removably secured to the shell, and which encloses all of the exposed tube ends.

The tubes extending through the tube plates 31 and 32 are divided into a number of bundles, those at the top of the shell, and above the normal liquid level, comprising one bundle, those just below another bundle, and so on to the bottom tubes, which comprise an additional bundle. The tubes in each bundle are, as illustrated, advantageously all of the same length, but they differ from each other in their cross-sectional areas. Thus, the lowermost bundle 34 consists of a limited number of tubes whose cross-sectional area is relatively small. The next bundle 35 consists of tubes whose cross-sectional areas are larger, or, in another way of reaching the same result, consists of a greater number of tubes of the same diameter as those in the bundle 34. The cross-sectional area of the next bundle 36 is progressively larger while the cross-sectional areas of the tubes in the top bundle 37 is the greatest of all. The purpose of this construction is to provide an increasing amount of space for the vapors which are formed as evaporation progresses, so that too great velocities of flow may not be obtained, and further, that a maximum difference in pressure between heating steam in the shell 25 and the vapors in the various tubes, may be obtained at all times, as presently explained. This construction permits of the continued utilization of the film evaporation principle, but aids in avoiding the difficulties which have been previously discussed.

Hoods are provided at the ends of the tubes to direct the vapors and liquid emerging therefrom into the tubes of the next higher bundle. Thus, it will be observed that the inner ends of the tubes in the lower bundle 34 are in direct communication with the liquid in the chamber 10. The opposite ends of these tubes, however, open into an expansion space 38 which is formed by positioning a hood 39 between the inner wall of the cover 33 and the ends of the tubes in the superimposed bundle 35. The hood 39 encloses the ends of all of the tubes in the two lower bundles, but provides a space 38 of increased volume, so that mixed vapors and liquid emerging from the tubes in the bundle 34 may flow freely into the tubes above encountering a minimum of resistance.

The vapors and remaining liquid are therefore constrained to pass into the tubes of the bundle 35, which, being of greater cross-sectional area, accommodates the increased volume of vapor without building up an excessive pressure. The high amount of surface presented to the liquid permits of the formation of films, which are thereupon evaporated. This augmented volume of vapor and remaining liquid is directed into the tubes of the next bundle 36, by means of a hood 41 encasing the inner ends of the tubes in the bundle 35 and the bundle 36. The increased volume of vapor and decreased volume of liquid then flows from the outer ends of the tubes in the bundle 36 into an expansion space 42 formed between the inner surface of the cover 33 and the tube sheet 31. This space is partitioned from the space 38 by means of a dividing wall 43 and hood 44, which operate in a manner similar to the hoods 39 and 41. It will be noted that the expansion space 42 is materially larger than the expansion space 38, and this construction is desired to maintain the control of velocity and difference of volume. The vapors entering the space 42 are accordingly directed into the upper tube bundle 37, which, as stated, comprises more tubes than the lower bundles, or, in other words, comprises a greater cross-sectional area of the tubes regarded collectively.

It may be explained that liquid is transmitted through the upper tubes, despite the fact that these tubes are apt to be above the normal liquid level, and that the amount of liquid is decreasing. In actual operation, the velocity of flow of the vapors through the bundle 36 and into the bundle 37 may be about one hundred feet per second. This rate of flow, while not so great as to cause the formation of mists, is nevertheless sufficient to carry the liquid as films through the upper bundle 37.

In operation, a quantity of liquid to be evaporated and concentrated is placed in the bottom of the chamber 10, and at a depth which will cover the exposed ends of the tubes in the lower bundle 34. Steam is then admitted to the shell 25 to flow around the tubes and to heat their contents. The liquid in the tubes is accordingly converted into vapor, which flows through the tubes, and from one bundle to the next, in the manner just described. The quantity of vapor liberated in each bundle causes a building up in volume, and an increase in velocity, both of which effects are desirable, if they do not exceed certain limits. Due to the progressive increase in cross-sectional area and the provision of the interposed expansion chambers, in this invention, this increase in quantity of vapor does not develop an excessive pressure which would reduce the heat transfer, or a velocity beyond that point which defines between good and poor operating conditions. It will be seen that by applying ordinary rules of design, based on quantity of steam employed, volume of liquid undergoing treatment, dimensions of the shell, etc., to apparatus constructed in accordance with the principles of this invention, it is possible to proportion the cross-sectional areas of the successive tube bundles and the columns of the expansion chambers to maintain a definite range of velocities throughout the entire zone of evaporation.

The vapors emerging from the inner ends of the tubes in the last bundle 37 expand into a large chamber just above the liquid level, and are deflected into the vapor chamber, formed in the upper part of the chamber 10, by means of the baffle 27. This construction prevents the formation of mists of unevaporated liquid, and facilitates the separation of such liquid as is entrained in the vapors already formed. The separated material falls by gravity into the liquid reservoir below, and so is returned to the heating zone, while the liberated and purified steam is removed from the apparatus through the exhaust port 16.

It will be observed that the present invention comprehends a novel type of apparatus for effecting the evaporation of industrial liquids with a high degree of efficiency, wherein the treated liquid is progressively vaporized, expanded to reduce its pressure, again treated, and expanded, to obtain the highest utilization of heating fluid consistent with the formation of pure vapors. It will also be understood that the number of passes to which the liquid is subjected in the apparatus may be varied, and that numerous modifications may be made in the specific embodiment shown, without departure from the principles of the invention. It is intended, therefore, that the scope of the invention should be determined from the following claims.

What is claimed is:

1. Apparatus for evaporating and concentrating industrial liquids comprising a chamber adapted to contain liquid to be evaporated in the lower portion thereof, a heating shell, a plurality of tubes placed horizontally in the shell, said tubes being divided into tube bundles of progressively increasing cross-sectional area, means for directing liquid from the chamber into the tube bundle of least cross-sectional area, a hood for directing liquid and vapors emerging from said tube bundle into the tube bundle of next greater cross-sectional area, a second hood for returning emerging liquid and vapors into the tube bundle of greatest cross-sectional area, said hoods being of such size as to permit of the expansion of vapors emerging thereinto, a baffle for separating entrained liquid from the vapors emerging from the tube bundle of greatest cross-sectional area, and a vapor chamber of relatively large volume for receiving said vapors.

2. Apparatus for evaporating and concentrating industrial liquids comprising a vertical chamber, means for supplying liquid to the lower portion of the chamber, means for withdrawing vapors from the upper portion of the chamber, a horizontal shell projecting from said chamber at the lower portion thereof, a plurality of heating tubes in the shell, means for supplying heat to said tubes placed horizontally, said tubes being divided into superimposed tube bundles of progressively increasing cross-sectional area, enclosed hoods encasing the adjacent ends of the tubes of successive bundles, direct fluid communication between the chamber and the tube bundle of least cross-sectional area, means for directing vapors from the uppermost tubes into the upper portion of the vertical chamber, and a baffle for separating entrained liquid from the vapors and returning it to the lower portion of the chamber.

3. Apparatus for evaporating and concentrating industrial liquids comprising a chamber adapted to receive liquid to be treated, a shell projecting horizontally from said chamber, a plurality of tubes collectively of relatively small cross sectional area placed horizontally in said shell and communicating with the portion of the chamber adapted to receive liquid, a plurality of tubes having a collectively greater cross sectional area than said first-named tubes disposed horizontally in the shell and above said first-named tubes, said tubes being interconnected at their ends remote from the chamber by a hood offering low resistance to liquid and vapor flow, the opposite ends of said second-named tubes discharging into a second hood sealing said tubes from said chamber, additional pluralities of tubes of progressively collective increased cross sectional area disposed seriatum within said shell, said last plurality of tubes discharging into said chamber above the normal liquid level therein, said portion of said chamber constituting a vapor space, a baffle for deflecting vapors emerging from said last-named tubes downwardly and into said chamber, and means for circulating heating fluid around all of said tubes in the shell, the flow of liquid and vapor through said apparatus being from the liquid portion of the chamber into the adjacent ends of the first-named tubes through all of said tubes and into the upper portion of said chamber.

4. Apparatus for evaporating and concentrating industrial liquids comprising a chamber adapted to contain liquid in the lower portion thereof, a heating shell, a plurality of tubes horizontally in the shell, said tubes being divided into tube bundles of progressively increasing cross-sectional area, the tube bundle of least cross-sectional area being in fluid communication with said chamber below the normal liquid level therein, a hood for directing liquid and vapor emerging from said tube bundles into the tube bundle of next greater cross-sectional area, a second hood for returning the emerging liquid and vapors into the tube bundle of greatest cross-sectional area, all said hoods being of such size as to permit the expansion of vapors emerging thereinto, a baffle for separating entrained liquid from the vapors emerging from the tube bundles of greatest cross-sectional area, and a vapor chamber of relatively large volume for receiving said vapors, the surface of the liquid in said first-named chamber constituting the bottom of said vapor chamber.

5. Apparatus for evaporating and concentrating industrial liquids comprising a chamber adapted to contain liquid in the lower portion thereof, a heating shell, a plurality of tubes horizontally in the shell, said tubes being divided into tube bundles of progressively increasing cross-sectional area, the tube bundle of least cross-sectional area being in fluid communication with said chamber below the normal liquid level therein, the bundles of greatest cross-sectional area communicating with said chamber above normal liquid level therein, a hood for directing liquid and vapors emerging from said tube bundles into the tube bundle of next greater cross-sectional area, a second hood of greatest cross-sectional area, said hood being of such size as to permit the expansion of vapors emerging thereinto, a baffle for separating entrained liquid from the vapors emerging from the tube bundles of greatest cross-sectional area, and a vapor chamber of relatively large volume for receiving said vapors, the surface of the liquid therein defining the bottom of said vapor chamber.

6. Apparatus for evaporating and concentrating industrial liquids comprising a chamber adapted to contain liquid in the lower portion thereof, a heating shell, a plurality of tubes horizontally in the shell, said tubes being divided into tube bundles of progressively increasing cross-sectional area, the tube bundle of greatest cross-sectional area communicating with said chamber above the normal liquid level therein, the tube bundle of least cross sectional area communicating with the chamber below the normal liquid level therein, a hood for directing liquid and vapor emerging from the tube bundle of least cross sectional area into the tube bundle of next greatest cross-sectional area, a second hood for returning the emerging liquid and vapors into the tube bundle of greatest cross-sectional area, all said hoods being of such size as to permit the expansion of vapors emerging thereinto, a baffle for separating entrained liquid from the vapors emerging from the tube bundles of greatest cross-sectional area, and a vapor chamber of relatively large volume for receiving said vapors, the surface of the liquid therein defining the bottom of said vapor chamber.

BURTON S. HUGHES.

CERTIFICATE OF CORRECTION.

Patent No. 1,840,234.                             Granted January 5, 1932, to

BURTON S. HUGHES.

It is hereby certified that error appears in the printed specification of the above numbered patent requiring correction as follows: Page 4, line 49, claim 2, strike out the words "placed horizontally" and insert the same to follow "tubes" in line 47, of same claim; and that the said Letters Patent should be read with this correction therein that the same may conform to the record of the case in the Patent Office.

Signed and sealed this 23rd day of February, A. D. 1932.

(Seal)                                                             M. J. Moore,
Acting Commissioner of Patents.